Patented June 14, 1949

2,473,014

UNITED STATES PATENT OFFICE 2,473,014

PREPARATION OF HALO-SUBSTITUTED ACETALS

Willard J. Croxall, Bryn Athyn, and Harry T. Neher, Bristol, Pa., assignors to Rohm & Haas Company, Philadelphia, Pa., a corporation of Delaware No Drawing. Application January 30, 1948, Serial No. 5,493

9 Claims. (Cl. 260—615)

This invention relates to a process for preparing 1,1-bis(haloalkoxy) ethanes or dihaloalkyl acetaldehyde acetals and related halo-substituted acetaldehyde acetals.

It is shown in our copending application Serial No. 613,034, filed August 27, 1945, now United States Patent No. 2,446,171, issued August 3, 1948, that vinyl esters, such as vinyl acetate, propionate, or butyrate, or other vinyl carboxylate, react in the presence of both a strongly acidic catalyst and a mercury catalyst with alcohols to form acetals. Our present application, which is a continuation-in-part of our said copending application, is directed to the preparation of acetals from halohydrins by reacting them with vinyl esters of carboxylic acids in the presence of the above-defined catalysts.

As a vinyl ester, there may be used the vinyl ester of any carboxylic acid. For economic reasons, the preferred esters are those of monocarboxylic acids, $RCOOCH=CH_2$, particularly wherein R is the hydrocarbon residue of the acid, which is preferably an aliphatic acid of two to four carbon atoms, acetic, propionic, or butyric. The carboxylic acid portion of the ester is not usually of importance, since it is eliminated in the reaction.

As a halohydrin, there may be used any of the compounds having one or more alcoholic hydroxyl groups of a polyhydric alcohol replaced with a halogen and having an alcoholic hydroxyl group remaining. Preferred halohydrins are of the formula $XR'OH$, wherein $R'$ is a divalent group, usually a hydrocarbon group and preferably an alkylene group of two to four carbon atoms, as in $XC_nH_{2n}OH$, wherein $n$ has a value of two to four with at least two carbon atoms thereof separating X and OH. X in the above formulae is a halogen, particularly chlorine and bromine.

Suitable halohydrins include ethylene fluorohydrin, ethylene chlorohydrin, ethylene bromohydrin, propylene fluorohydrin, propylene chlorohydrin (whether alpha or beta), propylene bromohydrin, trimethylene halohydrin, and the various butylene chloro- and bromo-hydrins. There should also be mentioned glycerol chlorohydrin, glycerol dichlorohydrin, glycerol bromohydrin, methylglycerol chlorohydrin, methoxyglycerol chlorohydrin, styrene chlorohydrin, butadiene chlorohydrin, chlorocyclohexanol, chloroethoxyethanol, and the like.

The reaction between halohydrin and vinyl ester is effected catalytically, a mercury catalyst and a strongly acidic substance being both required. As mercury compound, there is preferably taken a mercury oxide, such as the yellow oxide or the red oxide, which is used in conjunction with a strongly acidic catalyst, such as a strong mineral acid, for example, sulfuric acid or tetraphosphoric acid, or an "ansolvo acid," illustrated by the highly effective complexes formed from boron trifluoride and an oxygenated compound. The oxide and acid together form in situ a most effective catalytic combination which, for practical purposes, may be regarded as both a mercury catalyst and a strongly acidic catalyst. It is not essential, however, that the combination be formed in situ, for preformed mercury salts, such as mercury sulfate, which themselves yield a strong acid, as by hydrolysis, may be used even though they are slower in action than the described combinations. Other catalysts are mercury acetate-sulfate and acetate-trichloroacetate.

Complexes formed from boron trifluoride and an oxygenated organic compound are particularly valuable acidic catalysts in conjunction with a mercury compound. Such complexes are readily soluble in the reaction mixture, produce no troublesome by-products, and are readily disposed of at the end of the reaction. Coordination complexes of boron trifluoride and an oxygenated organic compound are typified by $BF_3.O(C_2H_5)_2$ or $BF_3.O(C_4H_9)_2$ from ethers, $BF_3.2CH_3COOH$ from carboxylic acids, $BF_3.C_4H_9OH$ or $BF_3.2C_2H_5OH$ from alcohols, $BF_3.CH_3COCH_3$ from ketones, and the like.

There are required relatively small proportions of mercury compound and strongly acidic catalyst for the promotion of acetal formation. As small amounts as 0.5 gram of mercury compound and 0.5 gram of strongly acidic catalyst per gram mole of vinyl ester are sufficient to give relatively rapid conversions and fair yields of acetals. Smaller amounts are effective, however, even though the yield in a given time may be less. One-gram portions of both mercury compound and strongly acidic catalyst per gram mole of vinyl ester, on the other hand, appear about optimum in respect to rate of reaction and yield with regard for economy of time, materials, and effort. Higher proportions may, however, be used, even ten-gram portions of each per gram mole of ester being generally satisfactory.

The optimum ratio of vinyl ester to halohydrin is about the theoretical one, one mole of ester to two moles of halohydrin. Yet, even at a ratio of one to one, the principal product is the acetal, particularly when vinyl ester is added to halohydrin. With low ratios, some hemiacetal ester is formed, such as

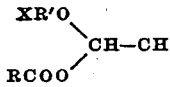

particularly when alcohol is added to vinyl ester. The hemiacetal esters are readily converted to acetals by reaction with an alcohol.

The importance of this stepwise procedure lies in the production of mixed acetals. Thus, acetals may be prepared from two different halohydrins or from one mole of a halohydrin and one mole of some other alcohol. For the latter purpose, there may be used any of the numerous alcohols detailed in our parent application, such as methyl, ethyl, butyl, octyl, dodecyl, octadecyl, allyl, methallyl, undecenyl, oleyl, benzyl, tetrahydrofurfuryl, hexahydrobenzyl, alkoxyethyl, or alkoxypropyl alcohol, or the like.

Excess alcohol is often desirable and serves as a solvent for the reaction system. Other solvents may be used, such as hydrocarbon solvents.

The reaction is effected from somewhat below room temperatures up to water bath temperatures, about 10° to about 90° C. The preferred temperature range is 30° to 60° C., but somewhat higher temperatures are often desirable to help drive the reaction toward completion after the initial vigor of the reaction has subsided. Cooling is frequently desirable in the initial stages and helps to prevent possible side reactions and losses of materials.

When the reaction has been effected, the acidic catalyst is destroyed, as by addition of an alkaline reacting material, including both inorganic compounds and organic products such as amines and quaternary ammonium hydroxides. Alternatively, both catalyst and the acid formed in the reaction may be destroyed. The acetals may then be readily separated by extraction or distillation or other suitable method and may be purified, if so desired.

The products obtained by the process described have wide utility. They are solvents, softeners, plasticizers. High-boiling acetals are also useful as fluids for transmitting power and pressure. The acetals shown herein are, furthermore, useful intermediates for forming other chemical compounds, since they have a halogen available for replacement. The dihaloalkoxyethanes may be reacted, for example, with an alkali polysulfide, such as sodium tetrasulfide, to form rubber-like materials.

The following examples present details of typical preparations of haloalkyl acetaldehyde acetals.

*Example 1*

A mixture was made from five gram moles of ethylene chlorohydrin, one gram of mercuric oxide, and two milliliters of the methanol-boron trifluoride complex, CH₃OH.BF₃, and thereto was added a gram mole of vinyl acetate while the temperature of the reaction was held at 44° to 48° C. with the aid of external cooling. The reaction mixture was then washed with water, separated from the resultant water layer, dried with a little potassium carbonate, and distilled. The fraction boiling at 105° to 106° C. at 13 mm. was found to be β-chloroethyl acetal. The yield of purified product was 52%.

*Example 2*

Anhydrous propylene chlorohydrin (1-chloro-2-propanol) was prepared from the commercially available, constant-boiling mixture of 54% propylene chlorohydrin and water by shaking it with an excess of anhydrous sodium sulfate and then distilling the dried material through a packed column. One gram mole of this purified propylene chlorohydrin was treated with one gram of red mercury oxide and two milliliters of the methanol-boron trifluoride complex. Thereto was slowly added with stirring one-half gram mole of vinyl acetate. The temperature of the reaction mixture was maintained at 50° to 55° C. with the aid of external cooling. The reaction mixture was allowed to stand on a water bath at about 50° C. for an hour. It was then treated with anhydrous potassium carbonate and fractionally distilled. There was taken off thirty-one grams of acetic acid, and thereafter there was obtained a fraction distilling at 60° to 70° C. at 30 mm. which corresponded in composition to dichloropropyl acetaldehyde acetal. This product is a thin liquid having a viscosity of 9.243 centistokes at 0° F., of 1.541 centistokes at 100° F., and of 0.599 centistoke at 210° F.

In place of the ethylene and propylene glycols used in the above examples, there may be used any of the other olefin fluorohydrin, chlorohydrin, or bromohydrins. By the same general procedure, there are obtained the corresponding acetals.

The following example is given to illustrate the preparation of a mixed acetal in which one O-substituent is a given halohydrocarbon group and the other is a group obtained either from a different halohydrin or from another type of alcohol.

*Example 3*

A mixture of two gram moles of vinyl acetate, one gram of mercuric oxide, and two grams of the boron trifluoride-acetic acid complex was treated with two gram moles of ethylene chlorohydrin at 0° to 10° C. This reaction mixture was then stirred for an hour, and two gram moles of allyl alcohol were added thereto. The reaction mixture stood overnight. Thereupon, it was neutralized, washed, and fractionated. The fraction boiling at 76° to 82° C. at 15 mm. was the mixed chloroethyl allyl acetal.

The mercury phosphate catalysts are very effective catalysts for promoting the reaction as above to the hemi-acetal stage. The hemiacetal ester may then be converted to the acetal, desirably by the addition of catalysts at the intermediate stage. Thus, for example, mercury oxide and tetraphosphoric acid may be used in the first stage and a boron trifluoride catalyst added to complete the second-stage reaction.

The reaction is applicable to halohydrins which contain other than a hydrocarbon group for R' in the formula XR'OH. There may be, for example, an additional halogen or an ether group or a hydroxyl group other than that indicated as constituting the holahydrin. In the last case, there may be formed the usual acetals and, in addition thereto, cyclic acetals or resins. The following examples are illustrative of the above considerations.

Example 4

To a mixture of 0.25 gram of mercury oxide, 0.5 milliliter of boron trifluoride-butanol complex, and 110 grams of glycerine monochlorohydrin there was slowly added forty-three grams of vinyl acetate while the reaction temperature was held below 60° C. with the aid of external cooling. The reaction mixture was then stirred for an hour and cooled. About two grams of anhydrous potassium carbonate was added to destroy the acidic catalyst. The mixture was then distilled. About fifteen grams of acetic acid was taken off. There was obtained a fraction of eleven grams, passing over at 150° C./10 mm., which corresponded in composition to the cyclic acetal, $(ClC_3H_5O_2)\cdot CHCH_3$. There remained thirty-five grams of a gummy resinous product which was a polyacetal formed by reacting each of the hydroxyl groups of the chlorohydrin with a molecule of vinyl acetate.

Example 5

A mixture was formed with sixty-five grams of glycerine dichlorohydrin, 0.5 gram of mercury oxide, and 0.5 milliliter of the boron trifluoride-methanol complex, and thereto was added forty-five grams of vinyl acetate. The temperature of the reaction mixture was held at 50° to 55° C. during the addition. The reaction mixture was then stirred for an hour, treated with about a half gram of potassium carbonate, and distilled. After a forerun which included twelve grams of acetic acid, there was obtained a fraction of twenty-eight grams distilling at 110°–115° C./20 mm. This was the bis(dichloropropyl) acetaldehyde acetal. It had a viscosity of 0.991 centistoke at 210° F. and of 3.769 centistokes at 100° F.

We claim:

1. A process for preparing halohydrin acetaldehyde acetals which comprises reacting at between 10° and 90° C. in the presence of a strongly acidic catalyst and a mercury catalyst a vinyl ester of a monocarboxylic acid, $RCOOCH=CH_2$, wherein R is an alkyl group of one to three carbon atoms, and a halohydrin, $XR'OH$, wherein X is a halogen, R' is a saturated divalent hydrocarbon group, and OH is an alcoholic hydroxyl group, destroying the acid catalyst in the reaction mixture, and separating therefrom an acetal.

2. A process for preparing halohydrin acetaldehyde acetals which comprises reacting at between 30° and 60° C. in the presence of mercury oxide and a boron trifluoride catalyst a vinyl ester, $RCOOCH=CH_2$, wherein R is an alkyl group of one to three carbon atoms, and a halohydrin, $XR'OH$, wherein X is halogen, R' is a saturated divalent hydrocarbon group, and OH is an alcoholic hydroxyl group, destroying the boron trifluoride catalyst in the reaction mixture, and separating therefrom the acetal.

3. A process for preparing alkylene halohydrin acetaldehyde acetals which comprises reacting at between 10° and 90° C. in the presence of a mercury catalyst and a boron trifluoride catalyst a vinyl ester, $RCOOCH=CH_2$, wherein R is an alkyl group of one to three carbon atoms, and an alkylene halohydrin, $XC_nH_{2n}OH$, wherein $C_nH_{2n}$ is an alkylene chain of two to four carbon atoms, $n$ having a value of two to four, and X is a halogen, destroying the boron trifluoride catalyst in the reaction mixture, and separating therefrom the acetal.

4. The process of claim 3 wherein the halohydrin is a chlorohydrin.

5. The process of claim 3 wherein the halohydrin is a bromohydrin.

6. A process for preparing ethylene chlorohydrin acetaldehyde acetal which comprises reacting at between 10° and 90° C. in the presence of mercury oxide and a boron trifluoride catalyst a vinyl ester, $RCOOCH=CH_2$, wherein R is an alkyl group of one to three carbon atoms, and ethylene chlorohydrin, destroying the boron trifluoride catalyst in the reaction mixture, and separating the acetal therefrom.

7. The process of claim 6 wherein the vinyl ester is vinyl acetate.

8. A process for preparing propylene chlorohydrin acetaldehyde acetal which comprises reacting at between 10° and 90° C. in the presence of mercury oxide and a boron trifluoride catalyst a vinyl ester, $RCOOCH=CH_2$, wherein R is an alkyl group of one to three carbon atoms, and propylene chlorohydrin, destroying the boron trifluoride catalyst in the reaction mixture, and separating the acetal therefrom.

9. The process of claim 8 wherein the vinyl ester is vinyl acetate.

WILLARD J. CROXALL.
HARRY T. NEHER.

REFERENCES CITED

The following references are of record in the file of this patent:

UNITED STATES PATENTS

| Number | Name | Date |
|---|---|---|
| 2,446,171 | Croxall et al. | Aug. 3, 1948 |
| 2,448,660 | Croxall et al. | Sept. 7, 1948 |